United States Patent [19]

Allen

[11] Patent Number: 5,754,217
[45] Date of Patent: May 19, 1998

[54] PRINTING SYSTEM AND METHOD USING A STAGGERED ARRAY SPATIAL LIGHT MODULATOR HAVING MASKED MIRROR ELEMENTS

[75] Inventor: John B. Allen, Lucas, Tex.

[73] Assignee: Texas Instruments Incorporated, Dallas, Tex.

[21] Appl. No.: 424,917

[22] Filed: Apr. 19, 1995

[51] Int. Cl.⁶ .............................. B41J 2/47; G02B 26/00
[52] U.S. Cl. ..................... 347/239; 359/291; 359/292
[58] Field of Search ...................... 347/134, 239, 347/255; 359/223, 224, 298, 290, 291, 292

[56] References Cited

U.S. PATENT DOCUMENTS

| | | | |
|---|---|---|---|
| 4,001,635 | 1/1977 | D'Auria et al. | 250/568 X |
| 5,061,049 | 10/1991 | Hornbeck | 359/224 |
| 5,083,857 | 1/1992 | Hornbeck | 359/291 |
| 5,101,236 | 3/1992 | Nelson et al. | 355/229 |
| 5,172,161 | 12/1992 | Nelson | 355/200 |
| 5,299,042 | 3/1994 | Takanashi et al. | 359/72 |
| 5,414,553 | 5/1995 | Nochebuena et al. | 347/255 X |
| 5,430,524 | 7/1995 | Nelson | 347/255 X |
| 5,459,492 | 10/1995 | Venkateswar | 347/255 X |

FOREIGN PATENT DOCUMENTS

| | | | |
|---|---|---|---|
| 62-35323 | 2/1987 | Japan | 359/224 |

*Primary Examiner*—David F. Yockey
*Attorney, Agent, or Firm*—Charles A. Brill; James C. Kesterson; Richard L. Donaldson

[57] ABSTRACT

A system 10 for independently illuminating a plurality of areas on an object 26 such as a printer drum is disclosed herein. The system 10 includes a light source 12 such as an LED or a plurality of LEDs. A spatial light modulator 14, which may be a movable mirror device, for receives light from the light source 12 and reflects selected portions of the light. The spatial light modulator 14 includes at least n rows of independently modulated pixels wherein a mask prevents more than 1/nth of each the rows from receiving and reflecting light at any point in time. The light from the spatial light modulator 14 is imaged (e.g., with imaging lens 24) onto rows and columns of the object 26 to be illuminated. The object 26 is illuminated in a way that each column is illuminated by a corresponding row of pixels.

28 Claims, 6 Drawing Sheets

Fig. 2b ILLUMINATED LINE

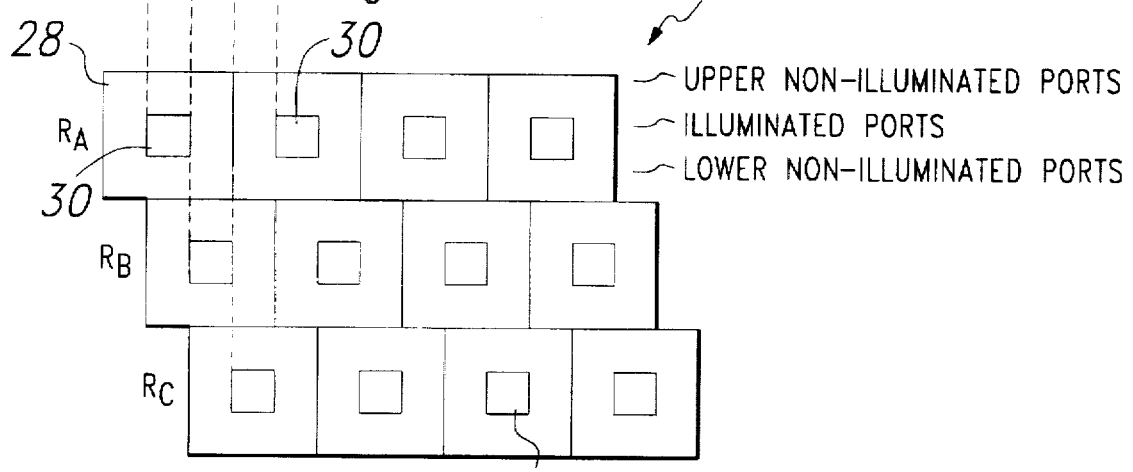
Fig. 3c
Fig. 3d
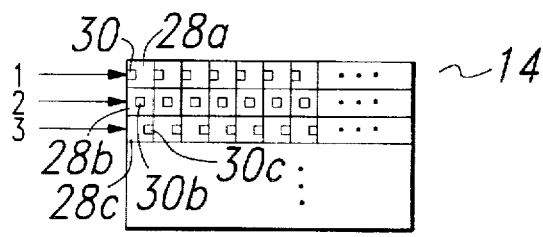
Fig. 4a
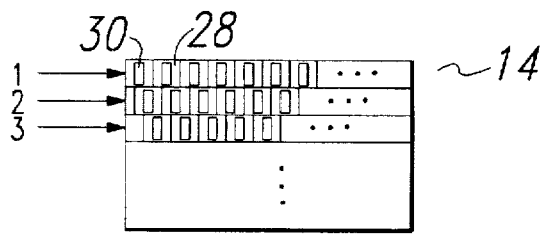
Fig. 4b

PRINTING SYSTEM AND METHOD USING A STAGGERED ARRAY SPATIAL LIGHT MODULATOR HAVING MASKED MIRROR ELEMENTS

CROSS-REFERENCE TO RELATED APPLICATIONS

The following patents and/or commonly assigned patent applications are hereby incorporated herein by reference:

| Patent No. | File Date | Issue Date | TI Case No. |
| --- | --- | --- | --- |
| 5,061,049 | 09/13/90 | 10/29/91 | TI-13173B |
| 5,083,857 | 06/29/90 | 01/28/92 | TI-14568 |
| 5,101,236 | 12/21/89 | 03/31/92 | TI-14585 |
| 5,172,161 | 12/31/90 | 12/15/92 | TI-15602 |
| 5,430,524 | 03/28/94 | 07/04/05 | TI-15602AC |

1. Field of the Invention

This invention generally relates to display and printer systems and specifically to a printing system which uses a staggered array spatial light modulator.

2. Background of the Invention

The requirement for hardcopy output is an ubiquitous element of the information revolution. In particular, electrophotography has become one of the most widely used systems and the dry toner process, has become the most popular for creating copies and prints of documents in a host of environments. The basics of electrophotography are well know to those skilled in the art. The fundamental elements of a electrophotographic printer or copier using the dry toner process include a photo sensitive medium, typically an organic photoreceptor (OPC), which is charged electrostatically to a predetermined voltage and polarity. Upon exposure to an optical image, generated by reflection or a light modulating system, portions of the originally uniform electrostatic charge on the OPC are erased where illuminated. Thus, an electrostatic latent image of the original (or the electronic) document is created on the OPC. In most modern systems, this image is passed by a source of developer materials which consists of electrostatically charged toner particles held to ferromagnetic carrier beads. The carriers are used to facilitate the transport of the materials into contact with the above mentioned latent image through the action of magnetic fields and rotating magnets within sleeved cylinders, typically called developer rollers. Through a designed interplay of electrostatic charges, the toner particles that are typically in the 10 micron diameter range, are separated from the carrier beads, typically 50 micron diameter particles, and retained in-place on the appropriate portions of the latent image resident on the OPC surface. The magnetic forces associated with the developer rollers carry the depleted ferromagnetic carrier beads back to the position where they are re-mixed with additional toner for development of subsequent images.

As is well known, the toner materials are normally plastics with flow promoting agents, charge control agents, and color pigments which melt at a predetermined temperature. The OPC surface then carries a developed latent image after exiting the proximity of the developing roller. Subsequently, the photoreceptor surface carrying the developed image is brought into contact with an image receptor, which in most common applications of electrophotography is a sheet of paper, but may be an intermediate material suitable for the build-up of multiple pigmented images as required for color printing. Electrostatic charging systems are typically used to transfer the toner from the OPC to the image receptor.

Whether the final image bearing member is ultimately paper or an other material, it can be successively operated on by multiple photoreceptors, a single photoreceptor, or an image bearing intermediate member to build up the full color image. It exits the printing process through a station referred to as the fuser, where the appropriate heat and/or pressure is applied to the image receptor and thereby fixes the image permanently.

One technology which has been found to be useful in printing and display applications utilizes a movable mirror device such as the Digital Micromirror Device (also referred to as Deformable Mirror Device or simply a DMD) manufactured by Texas Instruments, Inc. The movable mirror device is composed of many small mirrors called micromirrors which rotate about a fixed axis. The movable mirror device is illuminated with a beam of light. The rotation of the micromirror causes the light illuminating the micromirror to be deflected under the control of the rotation. Thus, each micromirror of a movable mirror device can be selectively rotated thereby patterning light reflected from the array. Specific details of movable mirror devices are provided in U.S. Pat. Nos. 5,061,049 and 5,083,857, each of which is incorporated herein by reference.

When using a movable mirror device in print applications, a long and narrow movable mirror device will typically be used. As an example, a movable mirror device array with about 100 rows and 7,000 columns may be utilized. To produce a device of this size, the chip may typically be 5.0 inches long. A chip, a chip which is shorter in length, and accordingly has less columns, is desired.

SUMMARY OF THE INVENTION

Other objects and advantages will be obvious, and will in part appear hereinafter and will be accomplished by the present invention which provides a printing system and method which utilizes a staggered array spatial light modulator.

A system for independently illuminating a plurality of areas on an object such as a printer drum is disclosed herein. The system includes a light source such as a single light emitting diode (LED) or a plurality of LEDs . A spatial light modulator, which may be a movable mirror device such as the Digital Micromirror Device (DMD) manufactured by Texas Instruments, Inc., receives light from the light source and reflects selected portions of the light. In some embodiments the mirror device is illuminated in a scanning mode, i.e., each row of mirror elements is illuminated individually and sequentially by scanning a beam of light over all of the micromirrors. In other embodiments, the mirror device is illuminated in a staring mode, i.e., the all the mirror elements of the entire array are illuminated simultaneously. The light from the spatial light modulator is imaged onto the object to be illuminated which is partitioned in rows of pixels (picture elements). The object is illuminated in a way that each pixel is, over time, illuminated by light from a corresponding column of micromirrors.

An advantage of the invention is that it reduces the number of columns of micromirrors required by the movable mirror device. This reduction may be important in printing applications where the number of columns is very high resulting in physically large integrated circuit chips which are difficult to illuminate. The reduction in the size of the chip will reduce the cost to manufacture the chip as well as the cost of the optical subsystem to illuminate the chip thereby reducing the cost of the system which the chip subsequently is installed.

BRIEF DESCRIPTION OF THE DRAWINGS

The above features of the present invention will be more clearly understood from consideration of the following descriptions in connection with accompanying drawings in which:

FIG. 2B illustrates a representation of the line which will eventually be printed;

FIGS. 3A and 3C illustrate objects (such as an OPC) to be illuminated FIGS. 3B and 3D illustrates movable mirror devices to provide the illumination to illuminate the objects in FIGS. 3A and 3C, respectively;

FIGS. 4A and 4B illustrate alternative movable mirror device arrays;

DETAILED DESCRIPTION OF ILLUSTRATIVE EMBODIMENTS

The making and use of various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not delimit the scope of the invention.

Figure 1A:
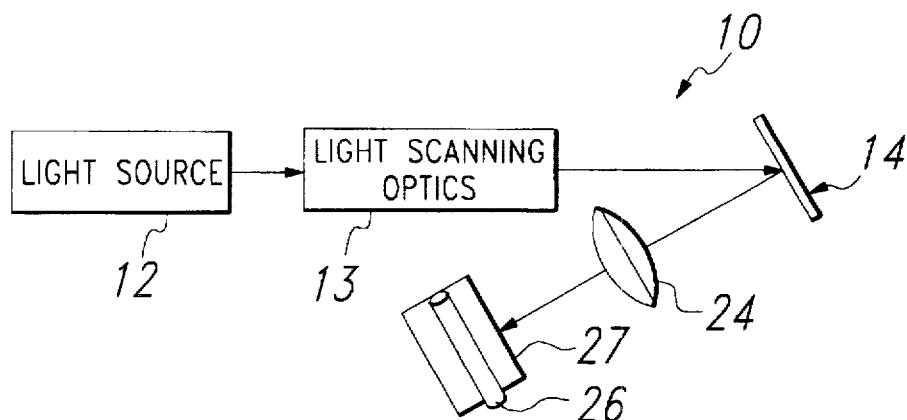
FIG. 1A is a block diagram of a first scanning mode embodiment printing system.

A first embodiment of the staggered array printing system 10 is of the scan mode variety and is depicted in FIG. 1A. A light source 12, such as a light laser diode illuminates a spatial light modulator 14. The spatial light modulator 14 may comprise a movable mirror device such as the Digital Micromirror Device (DMD) manufactured by Texas Instruments and described in U.S. Pat. Nos. 5,061,049 and 5,083,857, incorporated herein by reference. For the sake of the simplicity, the details of the movable mirror device will not be repeated herein.

In the system of FIG. 1A, the light from the light source 12 is scanned over the movable mirror device by means of light scanning optics 13. The light illuminating the movable mirror device from source 12 forms a long and narrow beam on the movable mirror device. The length of the beam is equal to the length of the movable mirror device 14 array and the width of the beam is equal to the width of the illuminated portion of micromirrors. In the preferred embodiment, each row of micromirrors of the movable mirror device array is sequentially illuminated. In the scanned mode, the beam is scanned rapidly enough that all of the mirror elements are illuminated during a time interval short enough that the drums turns only a small fraction of a pixel.

Modulated light is reflected from spatial light modulator 14 into projection lens 24 which images the light onto drum 26. Lens 24 may be an anamorphic lens if it is desired to have a printing beam which is not the same shape as the micromirror. The rotating drum 26 may then transfer toner to a sheet of paper 27.

Figure 1B:
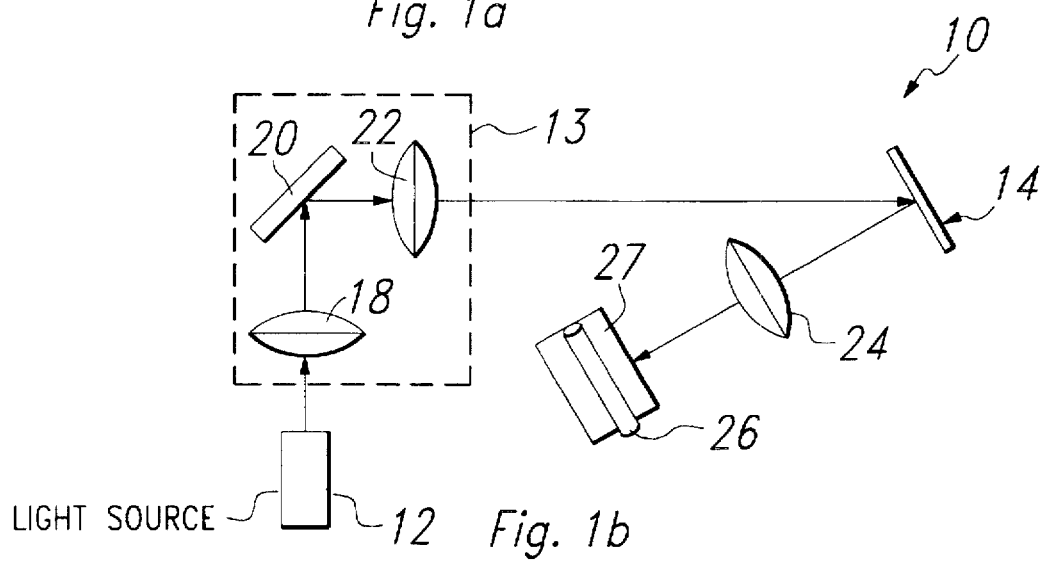
FIG. 1B is a block diagram of a second scanning mode embodiment printing system.

In the embodiment illustrated in FIG. 1B, the light scanning optics 13 comprises a first lens 18, a scanner 20, and third lens 22. The scanner 20 scans the light beam down the array within spatial light modulator 14 in the vertical direction successively illuminating the movable mirror device mirror elements in each row.

Figure 1C:
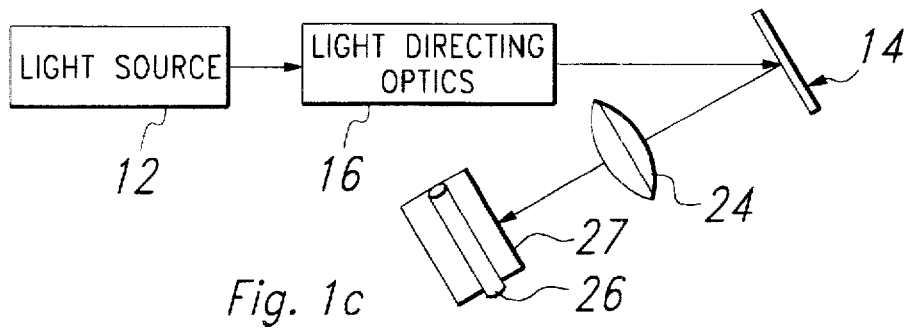
FIG. 1C is a block diagram of a staring mode embodiment printing system.

FIG. 1C depicts a staring mode embodiment of the staggered array printing system 10. A light source 12, such as a light emitting diode (LED), illuminates a spatial light modulator 14. As in the embodiments of FIGS. 1A and 1B, spatial light modulator 14 may comprise a movable mirror device such as the Digital Micromirror Device (DMD) manufactured by Texas Instruments and described in U.S. Pat. Nos. 5,061,049 and 5,083,857.

In the system of FIG. 1C, the light from the light source 12 is directed toward the movable mirror device by means of light directing optics 16. The light beam illuminates all of the micromirrors of the moving mirror device simultaneously. Modulated light is reflected from spatial light modulator 14 into projection lens 24 which images the light onto drum 26.

In the preferred embodiment, the light source 12 is pulsed (rapidly turned on and then off) at a period equal to that required by the drum 26 to rotate through one pixel. The light pulse will preferably have a 10% duty cycle so that a sharp image of the mirror element is formed on the drum (i.e., the mirror element image is not "smeared" by the rotation of the drum). Lens 24 may be an anamorphic lens if it is desired to have a printing beam which is not the same shape as the micromirror. The rotating drum 26 may then transfer toner to a sheet of paper 27.

Figure 1D:
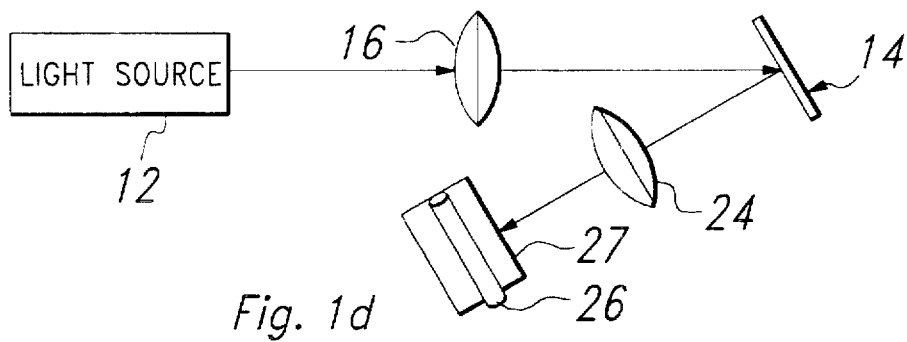
FIG. 1D is a block diagram of a second staring mode embodiment printing system.

In FIG. 1D, the light source 12 is a linear array of LED emitters and the light directing optics 16 is a toroidal lens which magnifies the LED emitters so that the image of each emitter fills the DMD.

Figure 2A:
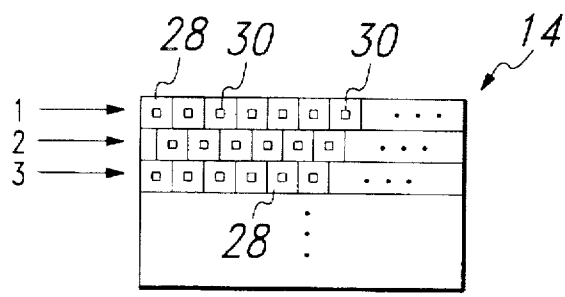
FIG. 2A is a block diagram of a movable mirror device array illustrating the portion of each micro-mirror element which is illuminated.

A first embodiment spatial light modulator 14.2 for the embodiments of FIG. 1 is illustrated in the simplified version in FIG. 2A. The spatial light modulator 14.2 preferably comprises a movable mirror device such as the Digital Micromirror Device (DMD) manufactured by Texas Instruments, Inc. This movable mirror device 14.2 is configured in a plurality of rows and columns as illustrated in FIG. 2A. Each of the rows comprises a plurality of mirror elements (sometimes called micromirrors) 28. In the embodiment illustrated here, each row of mirror elements 28 is displaced in the horizontal direction by ⅓ of a mirror dimension. Each of the three rows will illuminate ⅓ of the object to be illuminated, e.g., drum 26 as shown in FIG. 1. While illustrated herein with three rows each shifted a ⅓ of a mirror dimension, it should be noted that any number of rows larger than one may be used. In general, if n-rows are used each mirror will be displaced in the horizontal direction by 1/nth of a mirror dimension.

In the embodiment illustrated in FIG. 2A only the center 30 of each mirror element 28 is illuminated. In this case, the area of each mirror element 28 illuminated is a square whose dimension on each edge is ⅓ of the length of the movable mirror device mirror element 28. Of course, if the number of rows in a set of rows is different than three, then the dimension of the illuminated portion will be different.

The first row will print the pixels labeled 1 in FIG. 2B, the second row will print the pixels labeled 2 in FIG. 2B and the third row will print the pixels labeled 3 in FIG. 2B. Since three rows of movable mirror device 14.2 are used to print a single line, the movable mirror device 14.2 can be built with only ⅓ of the total columns. This decrease in the number of columns provides a significant manufacturability advantage over the prior art.

Figure 3A:
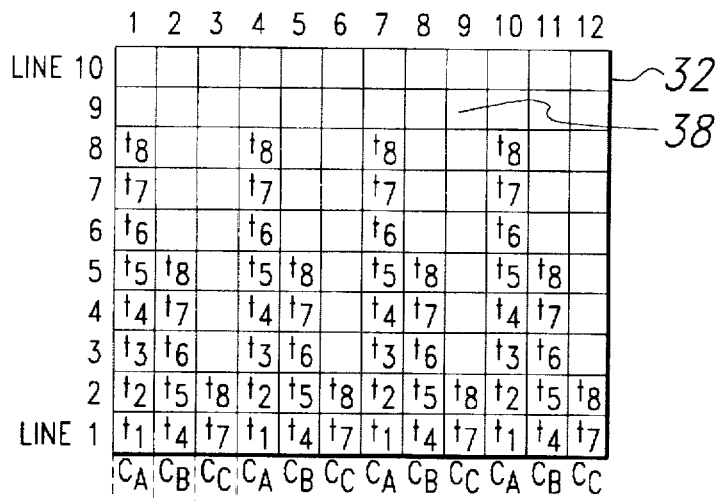
Figure 3B:
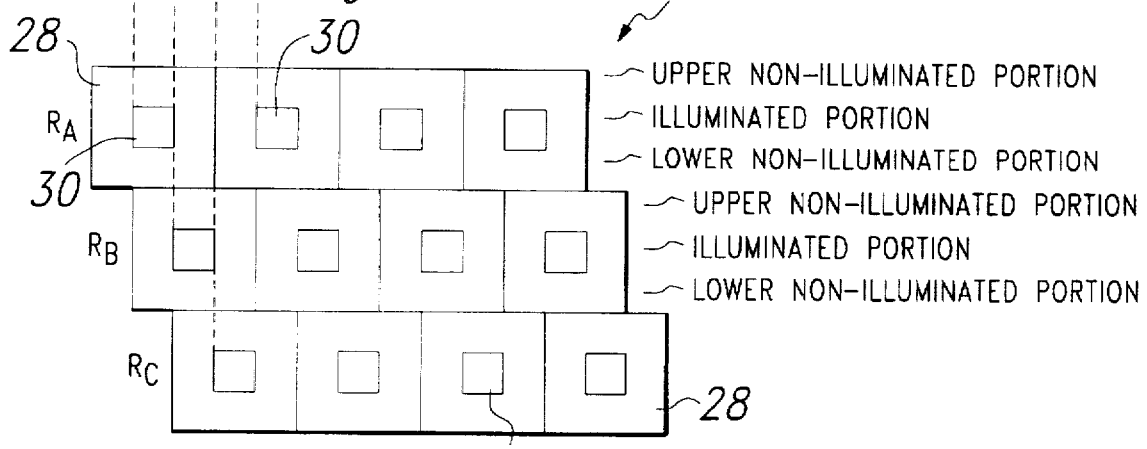

The operation of a staring system embodiment (e.g., as illustrated in FIGS. 1C and 1D) will now be described with reference to FIGS. 3A and 3B. FIG. 3B illustrates a simple movable mirror device array 14.3b which includes 3 rows (labeled $R_A$, $R_B$ and $R_C$) by 4 columns of mirror elements 28. FIG. 3A represents the object 32 to be illuminated where each of the boxes 38 is one pixel. In printing applications, this object 32 may be a rotating printer drum (e.g., element 26 in FIG. 1A) which will transfer toner to a sheet of paper (element 27 in FIG. 1A). The first row $R_A$ of movable mirror device 14.3b will print the pixels under the columns labeled $C_A$ (i.e., columns 1, 4, 7, etc.) in FIG. 3A, while the second row $R_B$ will print the pixels under the columns labeled $C_B$ and the third row $R_C$ will print the pixels under the columns labeled $C_C$. The resulting line of imagery corresponds to that illustrated in FIG. 2B.

To understand how the pixels are printed, imagine the box of FIG. 3A being slid down the page over the movable mirror device array of FIG. 3B. In the known electrographic (i.e., xerographic) printing process, this movement occurs when the drum 26 (FIG. 1A) rotates such that different portions of the drum 26 are in the light path of the beam reflected from movable mirror device 14.3b. To print, toner (not shown) is applied to the drum 26 surface and adheres to the spots where the modulated light impacts the drum. This toner, in turn, is transferred to a piece of paper (27 in FIG. 1A) which is moved adjacent to the drum 26. For a more detailed description of a light energy management system which can be used with a xerographic reproduction system, reference should be made to U.S. Pat. No. 5,101,236, incorporated herein by reference.

Returning to FIGS. 3A and 3B, at a first time $t_1$ the first, fourth, seventh, etc. columns $C_A$ of line 1 of object 32 will be selectively illuminated by light from the illuminated portions 30 of the first row $R_A$ of mirror elements 28. The areas on object 32 which may be illuminated are labeled $t_1$. At a second time $t_2$, the box will have shifted down such that line 2 of the object is illuminated by light from the first row $R_A$ of mirror elements 28.

At time $t_2$, nothing can be written to line 1 since this line will now be aligned to the lower non-illuminated portion of first row $R_A$ of mirror elements 28.

Similarly, at a third time $t_3$ the first, fourth, seventh, etc. columns $C_A$ of line 3 of the object can be illuminated by the light reflected from mirror elements 28 in the first row $R_1$ of movable mirror device 14.3b. Once again, the first and second lines are not illuminated since they are now aligned with the upper non-illuminated portion of the second row $R_B$ and the lower non-illuminated portion of the first row $R_A$ of mirror elements 28, respectively.

At a fourth time $t_4$ both line 1 and line 4 are simultaneously printed as illustrated by the pixels labeled $t_4$ in FIG. 3A. The first, fourth, seventh, etc. (columns $C_A$) of line 4 are illuminated by light reflected from mirror elements 28 from the first row $R_A$ of movable mirror device 14. At the same time, line 1 is now aligned with light from the second row $R_B$ of mirror elements 28. Accordingly, the second, fifth, eight, etc. (columns $C_B$) of this line can be illuminated. Note that during the fourth time $t_4$, the second and third lines are not illuminated since they are now aligned with the upper non-illuminated portion of the second row $R_B$ and the lower non-illuminated portion of the first row $R_A$ of mirror elements 28, respectively.

At time $t_7$ the first line is aligned with the third row $R_C$ of mirror elements 28 so that portions of three lines (e.g., lines 1, 4, and 7 at time $t_7$) are being simultaneously illuminated. This shifting will continue until each of the lines of object 32 have been selectively illuminated.

FIGS. 3C and 3D can be utilized to demonstrate a scanned system as illustrated in FIG. 1A or 1B. In the scanned system, each row $R_A$, $R_B$, or $R_C$ is illuminated at a different time by a beam which is as long as the movable mirror device and whose height is equal to that of the illuminated portion of the mirror element on the movable mirror device. Accordingly, at time $t_1$ line 1 is illuminated. During times $t_2$ and $t_3$, no part of object 32 is illuminated since no part is aligned with the array 14.3d. Note that at time $t_{11}$, line 1 of the object 32 is aligned with the second row $R_B$ of spatial light modulator 14.3b. This sequence will continue until each pixel 38 is imaged.

It is, of course, noted that in the scanning mode the light illuminates the apertures for only one third of the time that the beam is scanned over the movable mirror device. This inefficiency, however, is made up for because the light source can be turned on only when the scanner is pointed to the aperture over each mirror element 28. Hence, the light source can be turned on only when the scanner is pointed to the aperture over the mirror element In addition, during the scanned mode one third of the light transmitted will reach the movable mirror device (as illustrated by the fact that the illuminated portion 30 extends one third of each mirror element). In the staring mode in which the entire movable mirror device is illuminated, only one-ninth of the light reaches the movable mirror device since the area occupied by the apertures over the mirror elements account for only one ninth of the area of the movable mirror device.

FIGS. 4A and 4B illustrate two alternate embodiments of movable mirror device arrays 14.4a and 14.4b. These embodiments are similar to those previously discussed with respect to FIGS. 2A (and 3B and 3D). In the embodiment in FIG. 4A, the mirror elements 28 are disposed in aligned columns. In this case, the illuminated portions are staggered such that the illuminated portion 30A in row 1 is aligned to the left edge of mirror element 28A while the illuminated portion 30B is centered in mirror element 28B and illuminated area 30C is aligned to the right edge of mirror element 28C. Using this technique, the same results as illustrated by FIGS. 3A and 3B (or 3C and 3D) may be achieved. It is also noted that the illuminated portions 30 do not need to be centered in the staggered array (FIG. 2A).

FIG. 4B has been included to illustrate the fact that the illuminated portions 30d are not required to be square. In this example, the illuminated portions comprise rectangular areas 30d on each mirror element 28. The resulting pixel elements which will be printed will be rectangular in this case. While square pixel elements are typically preferred, it is noted that other shaped elements such as rectangles, circles, triangles and other polygons may also be used. Of course, if anamorphic optics are used, the rectangular portion of the mirror element can be used to create a square image.

Figure 5:
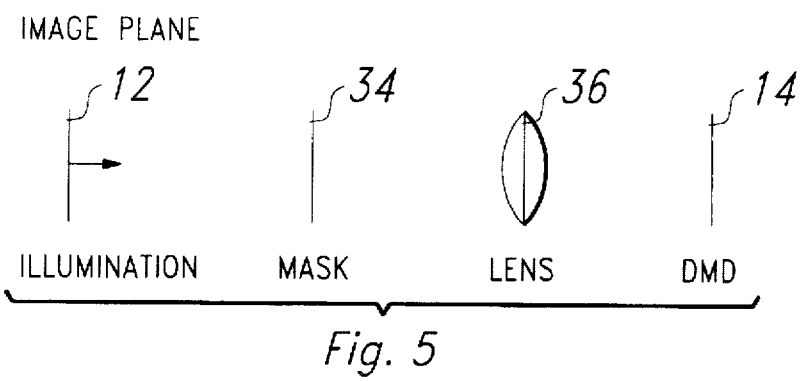
FIG. 5 illustrates an image plane application for illuminating the movable mirror device.
Figures 6, 7A:
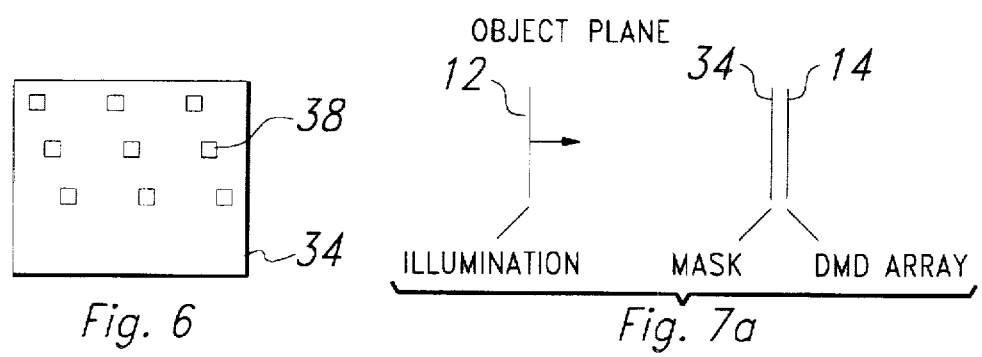
FIG. 6 illustrates a mask which is utilized to control the illumination of the movable mirror device.
FIG. 7A and 7B illustrates an object plane implementation of illuminating the movable mirror device array.

The controlled illumination can be obtained by object plane or image plane illumination as depicted in FIGS. 5 through 7. In image plane illumination, a mask 34 (shown in FIG. 6 as well) containing apertures is illuminated by illumination source 12 and imaged by a lens 36 onto the movable mirror device 14 as shown in FIG. 5. The apertures 38 may comprise square apertures as well as other shaped apertures.

Figures 7B, 9A:
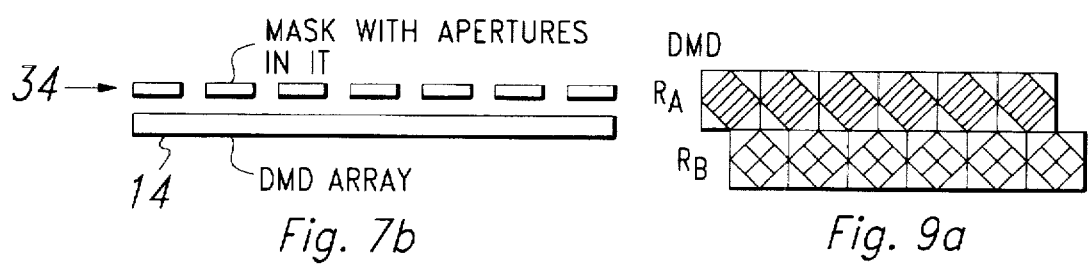
FIGS. 8A, 9A, and 10A are block diagrams of alternative embodiments of movable mirror device arrays.

Alternatively, as illustrated in FIG. 7A, in object plane illumination the mask 34 is placed very close to the movable mirror device 14. Effectively, the movable mirror device 14 is in the object plane of the mask 34. Object plane illumination may typically be preferred since there is no intervening lens 34 to introduce distortions. Also, the resulting system is smaller. The smaller structure is easier to make rigid. As illustrated in FIG. 7B, the mask 34 should be close to the movable mirror device 14 so that the beam falling on the movable mirror device mirror element 28 (FIG. 2A) is about the same size as the mask aperture 38 (FIG. 6). Calculations indicate that the distance of less than about 10 microns, for example about 3 to 6 microns, should suffice. If the beam defracts so much that the entire mirror element 28 is illuminated, a large fraction of the light reflected back from the mirror 28 will not exit the aperture and pass through the remainder of the optics.

The movable mirror device 14 is imaged onto the drum as illustrated in FIG. 1. Since the drum is rotating, the exposure should be short in time so the charge generated on the drum is not "smeared" resulting in the loss of image in the direction of motion of the drum. The short exposure can be obtained by driving the light source with a pulsed waveform. Typical waveforms have a pulsed duration of 33 microseconds with a 10% duty cycle. A 10% duty cycle is maybe inefficient in terms of light output since the source is off 90% of the time. An efficient approach is to leave the light source 12 on continuously and scan the beam over the mask 38 at such a speed that the aperture is illuminated for only a short time, for example 33 microseconds. Since the apertures are spaced at a different distance apart equal to three times their dimension, the light source 12 can be operated at a 33% duty cycle without loss and efficiency. The source can be pulsed as described so long as the scanned beam illuminates only a single row of mirrors at a given instant.

In other movable mirror device applications, the use of coherent illumination of the movable mirror device has resulted in spurious and offensive diffraction patterns from the movable mirror device hinges and mirror elements. There should be not such scattering problems here since the location of the mask 34 controls the portion of the movable mirror device 14 which is illuminated. The mask can be positioned so that only the desired portion 30 of the mirror element 30 is illuminated.

The concept of a mask offers an alternative means of manufacturing movable mirror devices. The movable mirror device 14 need not be designed so that the mirror element 28 is of optical quality throughout all portions of the mirror element. This design tolerance is possible since the portions of the mirror 28 which are not of optical quality can be covered with the mask 34. The mask 34 also allows the size of the mirror elements 28 to be effectively changed without actually changing the physical dimension of the elements. A standard movable mirror device can be built with a single mirror size and effective size of the mirror set by the size of the mask aperture.

Figures 8A, 9B:
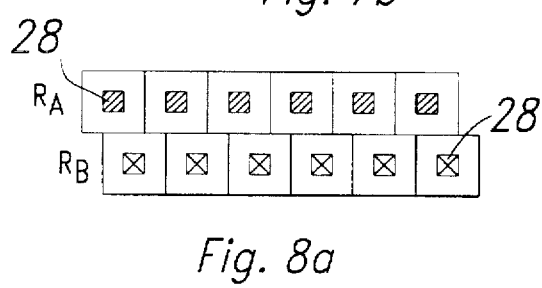
FIGS. 8B, 9B, 9C, and 10B are representations of the line which will be written by the array of the corresponding FIGS. 8A, 9A, or 10A.
Figures 8B, 9C:
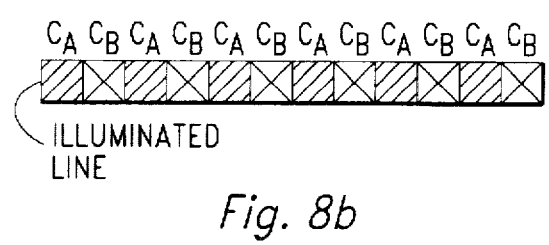

An alternate embodiment spatial light modulator array 14 is illustrated in FIG. 8A. In this embodiment, a smaller mirror element 42 is included. The smaller mirror element 42 covers only a portion of the area of the larger mirror elements (as in FIG. 2A). In the example illustrated in FIG. 8A, the mirror element 42 has a length and width which is one half of the full coverage mirrors (as in FIG. 2A). Accordingly, two rows $R_A$ and $R_B$ are utilized to image each line of text. A representation of the text line is illustrated in FIG. 8B.

The micromirrors 42 shown in FIG. 8A are shaded and cross-hatched. This pattern is repeated along the movable mirror device in the process dimension. As an example, the micromirrors 42 may be on about 17 micron centers and may be about 8 microns on the side. As before, the pixels may be square and, for example, about 42 microns on the side. The shaded micromirrors 42 (in FIG. 8A) expose the shaded pixels (in FIG. 8B) and the cross-hatch micromirrors expose the cross-hatch pixels. In one possible embodiment, the array 14 is 2.4 inches long and 2.18 mm high and may be magnified by a factor of 5 on the drum. This version has 600 dpi (dots per inch) performance. In a second embodiment, the array is 4.8 inches by 2.18 mm and is magnified by a factor of 2.5 to the movable mirror device. This embodiment has 1200 dpi performance.

The operation of the embodiment of 8A is analogous to the operation of the previously described systems. This embodiment provides the advantage of eliminating the necessity of mask 34 of FIGS. 5–7. As with the other embodiments, the spatial light modulator array 14 can be used in either a scanned system (FIGS. 1A and 1B) or a staring system (FIGS. 1C and 1D).

An alternate architecture of the movable mirror device 14.9a is shown in FIG. 9A. The mirror elements 44 are diamond shaped. In this context, diamond shaped mirror elements 44 include any mirror elements which are rotated such that non-parallel edges of adjacent mirror elements are next to each other. In the illustrated example, the mirror elements 44 are square but other shapes may also be utilized. For example, the mirror elements 44 may be 11.3 microns long on the side and spaced on 17 micron centers. This architecture, if used directly, will produce pixels as shown in FIG. 9B. Note that the imaged pixels are non-contiguous. The non-exposed region is not the shape of the micromirrors and cannot be exposed by them for contiguous coverage as was possible with the system of FIG. 1.

However, if the array 14.9a of FIG. 9A is utilized with a scanned system as illustrated in FIGS. 1A and 1B, the discontinuities of coverage can be eliminated. In this embodiment, the first row $R_A$ of mirror elements will image the pixels labeled $C_A$ in FIG. 9C. The object 32 will then shift (e.g. the drum 26 will rotate) and the second row $R_B$ of mirror elements will image the pixels labeled $C_B$. The scanned mode will continue alternating between the first row $R_A$ until the entire page has been written to.

Figure 10A:
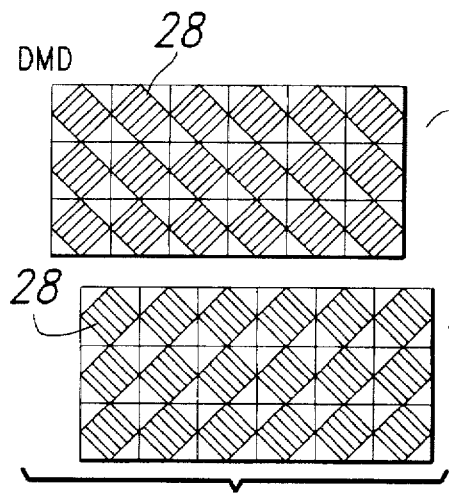

Another embodiment architecture for the movable mirror device 14 is shown in FIG. 10A. The upper portion of FIG.

10a shows a first sub-array 14a of three rows of micromirrors 46 which are shaded. As an example, these micromirrors 26 may be on about 17 micron centers and diamond shaped with sides which may be about 11.3 microns. A second and identical sub-array 14b is shown below. In the given example, this sub-array 14b may be displaced by 8.5 microns in the vertical (or process) direction and displaced by 8.5 microns in the horizontal (or cross-process) direction. That sub-array pattern may be repeated in the process direction providing as many micromirrors as needed. FIG. 10A shows three micromirrors rows per sub-array 14a and 14b. However, there could be more. The limit is determined by the registration requirements of the micromirror images in successive exposures. While specific dimensions are provided as examples, it is noted that any appropriate size micromirror may be used.

Figure 10B:
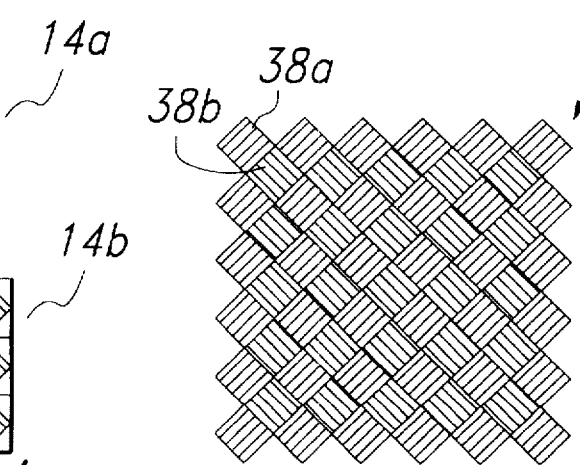

FIG. 10B depicts the pixels written on the drum 26 (FIG. 1B) by a movable mirror device with sub-arrays 14a and 14b. One set of cross-hatched pixels 38a are written by the upper subarray 14a and another set of cross-hatched pixels 38b are written by the lower sub-array 14b. Note that contiguous coverage of pixels is obtained on the object 32 by this architecture.

Each row in subarrays 14a and 14b can be utilized to image a separate line, or alternatively, each row can be used to image the same line a number of times. Multiple imaging may be desired if enough light energy cannot be transmitted to the object to be illuminated in a single illumination period. It is further noted that the multiple imaging rows can also be utilized in any of the other embodiments described herein (e.g., the embodiment of FIGS. 2A, 3A or 3B, 4A, 4B, or 8A).

The movable mirror device array of FIG. 10A may be utilized in a number of ways. In one version a movable mirror device which is 4.8 inches by 1.08 mm may be magnified by a factor of 2.5. The resulting performance is 900 dpi in the 45 degree direction of the copy and is 600 dpi in the process dimension. In a second version a movable mirror device of this architecture may be 3.4 in long and 1.08 mm high. The movable mirror device 14 is magnified by a factor of 3.4 and has 600 dpi performance is the 45 degree direction.

Figure 11:
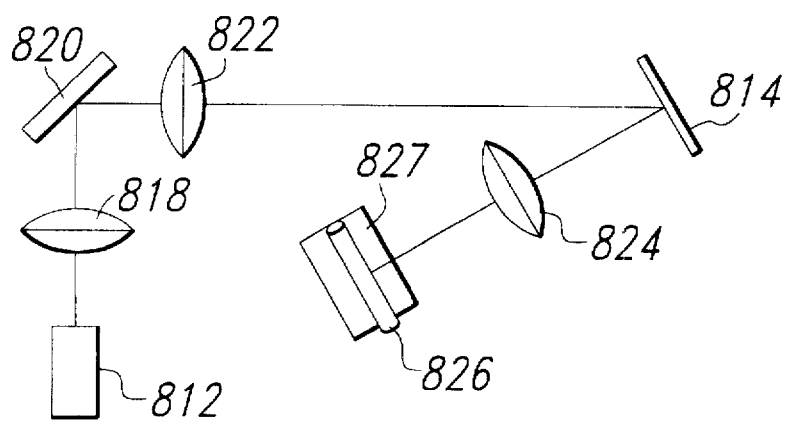
FIG. 11 is a schematic of a second embodiment printing system.
Figure 12:
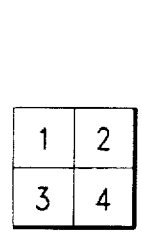
FIG. 12 illustrates a gray level algorithm for an alternative system which using isomorphic optics.

If a multiple phase printing algorithm is required, FIG. 11 shows an alternative approach to using isomorphic optics. In FIG. 11, the movable mirror device 814 has twice as many elements in the horizontal or cross-production cross-process direction as the movable mirror device 14 in FIG. 1A. Also the magnification is reduced by a factor of two to maintain the same page width as in FIG. 1A. The resulting four phases are illustrated in FIG. 12.

This embodiment can be used to provide increased gray level resolutions. Each pixel 40 has four non-overlapping phases labeled 1, 2, 3, and 4 in FIG. 12. (The pixel 40 is equivalent to each pixel 38 in the array illustrated in FIG. 3A.) Since each pixel 40 is so small, the human eye cannot differentiate the four phases but can only add them together. Therefore, if a really dark pixel is desired, each of the subphases 1, 2, 3, and 4 will be printed to. On the other hand, as a less dark pixel is desired, only some of the subphases 1, 2, 3, or 4 will be illuminated.

Figure 13:
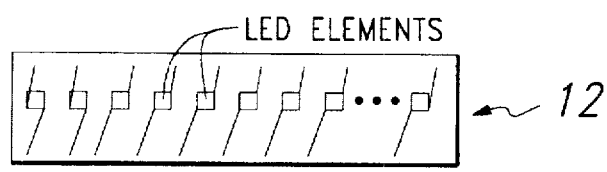
FIG. 13 illustrates an LED array which may be utilized the systems of the present invention.
Figure 14:
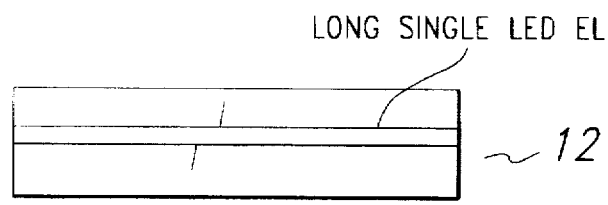
FIG. 14 illustrates an LED array which may be utilized the system of the present invention.

FIGS. 13 and 14 illustrate two light sources 12 which may be utilized with the present invention. Most proposed LEDs for the printer applications consist of widely spaced discrete LED emitting areas as shown in FIG. 13. This light source may also be used with the embodiments described with respect to the present invention.

Figure 15:
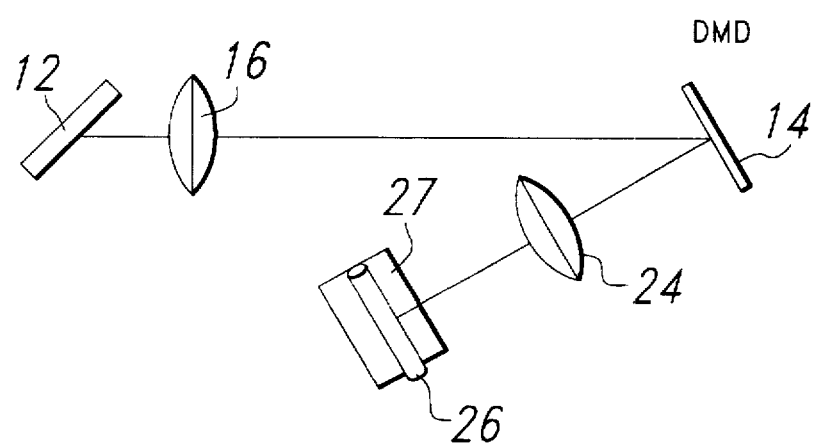
FIG. 15 is a schematic of a system utilizing an LED array.

FIG. 14, on the other hand, illustrates an LED array which may be used with the present invention. An LED array is a high power LED which permits several improvements in the printing system. The LED array has emitting areas placed as close to each other as feasible and forms, to the extent possible, a continuum of emitting areas as depicted in FIG. 14. Since the shape of the movable mirror device array of 14 is a long and narrow rectangle, the LED is also long and narrow so that a relatively simple isometric imaging system can be used to relay the light to the movable mirror device 14 as illustrated in FIG. 15.

The additional power provided by the "super LED" can be invested in several ways to lower the cost and size of the system. First of all, the f-number of lens 24 in FIG. 15 can be increased since more light is available by reducing their diameter. The f-number can be increased so long as the resolution of lens 24 is sufficient to produce a sharp enough pixel on the drum. The result will be a greater depth of field in the plane of the drum 26 allowing the drum 26 to wobble more during its rotation and generally loosening the tolerances to which it must be position.

The additional power provided by the LED array could also allow lower transmission lens elements 16 and 24 to be used and still maintain adequate exposure. Current designs require up to 30 or more exposures by movable mirror device elements to achieve maximum density on the copy. A more powerful LED would allow a maximum exposure with fewer movable mirror device elements reducing the cost of the movable mirror device. The LED array also permits the use of the mask approach to controlling the illumination on the movable mirror device for the staggered array concept as discussed previously. The biggest objection to the mask is the loss of energy caused by the presence of the mask 34. The opaque area of the mask 34 can cause a loss of 90% or more of the light from the LED 12. However, the increased light from the LED array could offset this loss. If the staggered movable mirror device array 14 uses three rows of movable mirror device mirror elements 28 to write each line, the width of the movable mirror device array 14 could be reduced by a factor of three. If the same F # is maintained to preserve the exposure energy, the diameter and focal lengths of the lenses 16 and 24 of FIG. 15 can be reduced by a roughly factor of three. Such reduction would reduce the cost and volume of the optics. The width of the movable mirror device 14 would also be reduced by a factor of three resulting in the substantially smaller movable mirror device 14 although the number of mirrored elements would remain unchanged.

If a rectangular writing spot is desired, the width of the staggered movable mirror device array could be doubled with the attendant doubling the number of mirror elements. The movable mirror device array would now be two-thirds the original size rather than one-third the size. However, the writing algorithm depicted in FIG. 12 could now be used providing a rectangular writing spot with an isomorphic optical system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for independently illuminating a plurality of areas on an object, said system comprising:

a light source positioned on a light path, said light source for transmitting light along said light path;

a mask on said light path for blocking portions of said transmitted light and for allowing portions of said transmitted light to pass;

a spatial light modulator on said light path for receiving light passing through said mask from said light source and reflecting selected portions of said light corresponding to said areas to be illuminated on said object, said spatial light modulator comprising sets of n rows of independently modulated pixels wherein said mask prevents more than 1/nth of each said row from receiving and reflecting said light at any point in time, wherein n is an integer greater than one; and a scanner positioned on said light path between said light source and said spatial light modulator, said scanner for imaging said light on some of said rows of independently modulated pixels;

wherein said object is illuminated by receiving said reflected light from said spatial light modulator, said areas being illuminated comprising p columns such that each of said columns on said object is illuminated by one of said n rows of said pixels.

2. The system of claim 1 wherein each of the n rows includes a plurality of independently modulated pixels which are staggered with respect to the independently modulated pixels of others of the n rows.

3. The system of claim 1 wherein the spatial light modulator is composed of several subarrays of n rows of pixels which are aligned so that a pixel can repeatedly be exposed on the object.

4. The system of claim 1 wherein said spatial light modulator comprises a movable mirror device.

5. The system of claim 4 wherein said spatial light modulator comprises:

a plurality of pixels formed in a layered structure;

said layered structure including an insulated substrate, a spacer layer on said substrate, a conductive reflecting layer on said spacer layer, and a plurality of addressing and landing electrodes;

each of said pixels including a deflectable element formed in said reflecting layer and connected to said reflecting layer by at least one hinge formed from said reflecting layer, a well formed in said spacer layer and extending from said deflectable element to said substrate, an addressing electrode on said substrate at the bottom of said well and located to deflect said deflectable element by electrostatic attraction, and a landing electrode on said substrate at the bottom of said well, said first landing electrode located both to contact said deflectable element when said deflectable element is deflected by attraction by said first addressing electrode to said substrate and to prevent said deflectable element from contacting said addressing electrode.

6. The system of claim 4 wherein said independently modulated pixels comprise mirror elements, each of said mirror elements being spaced from adjacent mirror elements in the same row.

7. The system of claim 1 wherein said light source is selected from the group consisting of a light emitting diode, a laser diode and an incandescent lamp.

8. The system of claim 1 wherein said object comprises a printing drum.

9. The system of claim 1 and further comprising light directing optics between said light source and said spatial light modulator for simultaneously illuminating all of said rows of independently modulated pixels.

10. The system of claim 1 wherein each of the independently modulated pixels includes a reflective region, only a portion of the reflective region of each of the independently modulated pixels being illuminated.

11. The system of claim 10 and further comprising a mask positioned between said light source and said spatial light modulator, said mask being spaced from said spatial light modulator.

12. The system of claim 11 wherein said mask is positioned less than 10 microns from said spatial light modulator.

13. The system of claim 10 wherein only a square portion of each of independently modulated pixels can be illuminated.

14. A system for independently illuminating a plurality of areas on an object, said system comprising:

a light source positioned on a light path, said light source for transmitting light along said light path;

a mask on said light path for blocking portions of said transmitted light and for allowing portions of said transmitted light to pass;

a movable mirror device on said light path for receiving light passing through said mask from said light source and reflecting selected portions of said light corresponding to said areas to be illuminated on said object, said movable mirror device comprising sets of n rows of independently modulated pixels wherein said mask prevents more than 1/nth of each said row from receiving and reflecting said light at any point in time, wherein n is an integer greater than one; and a scanner positioned on said light path between said light source and said movable mirror device, said scanner for imaging said light on some of said rows of independently modulated pixels;

wherein said object is illuminated by receiving said reflected light from said movable mirror device, said areas being illuminated comprising p columns such that each of said columns on said object is illuminated by one of said n rows of said pixels; and wherein said movable mirror device comprises a plurality of pixels, each of said pixels including a deflectable beam, an address electrode adjacent said beam, and a landing electrode adjacent said beam, such that a voltage applied between said beam and said address electrode deflects said beam toward said address electrode, and said landing electrode is located to contact said beam deflected toward said address electrode and prevent said deflected beam from contacting said address electrode.

15. A system for independently illuminating a plurality of areas on an object, said system comprising:

a light source positioned on a light path, said light source for transmitting light along said light path;

a mask on said light path for blocking portions of said transmitted light and for allowing portions of said transmitted light to pass; and a spatial light modulator on said light path for receiving light from said light source passing through said mask and reflecting selected portions of said light corresponding to said areas to be illuminated on said object, said spatial light modulator comprising at least one set of three rows of independently modulated pixels wherein said mask prevents more than one third of each said row from receiving and reflecting said light at any point in time;

wherein said object is illuminated by receiving said reflected light from said spatial light modulator, said areas being illuminated comprising p columns such that each of said columns on said object is illuminated by one of said n rows of said pixels.

16. A printing system comprising:

a light source located on a light path, said light source for producing a beam of light along said light path;

a first lens on said light path for receiving light from said light source;

a scanner on said light path for receiving light from said first lens;

a second lens on said light p for receiving light from said scanner;

a mask on said light path for blocking portions of said transmitted light and for allowing portions of said transmitted light to pass; and a spatial light modulator on said light path for receiving light from said second lens and reflecting selected portions to an imaging lens, said spatial light modulator comprising at least n rows of independently modulated pixels wherein said mask allows only 1/nth of each said rows to receive and reflect said light at any point in time; and a printing drum on said light path for receiving said reflected light from said imaging lens, said printing drum including areas for being selectively and independently illuminated, said areas comprising p rows such that each of said columns on said object is illuminated by a corresponding row of said pixels.

17. The system of claim 16 wherein said spatial light modulator comprises a movable mirror device.

18. The system of claim 16 wherein said light source is selected from the group consisting of a light emitting diode or laser diode or an incandescent lamp.

19. The system of claim 16 wherein said printing drum comprises a rotating cylindrical printing drum.

20. The system of claim 16 and further comprising a mask positioned between said light source and said spatial light modulator, wherein the mask is spaced from both the spatial light modulator and the light source.

21. The system of claim 20 when said mask is positioned such that only a portion of each of said independently modulated pixels is illuminated.

22. The system of claim 21 wherein said mask is positioned such that only a center portion of each of said independently modulated pixels is illuminated.

23. A method independently illuminating a plurality of areas on an object, said method comprising the steps of:

transmitting light through a mask to a spatial light modulator, said mask being spaced from said spatial light modulator;

receiving said light at said spatial light modulator, said spatial light modulator comprising at least one set of n rows of independently modulated pixels wherein only 1/nth of each said rows is allowed to receive and reflect said light at any point in time, wherein n is an integer greater than one;

reflecting a modulated version of said light from said spatial light modulator toward an object to be illuminated; and receiving said reflected light from said spatial light modulator at object to be illuminated, said areas being illuminated comprising p columns such that each column on said object is illuminated by a corresponding row of said pixels.

24. A system for independently illuminating a plurality of areas on an object, said system comprising:

a light source positioned on a light path, said light source for transmitting light along said light path;

a mask on said light path for blocking portions of said transmitted light and for allowing portions of said transmitted light to pass; and a spatial light modulator on said light path for receiving light from said light source and reflecting selected portions of said light corresponding to said areas to be illuminated on said object, said spatial light modulator comprising sets of n rows of independently modulated pixels, each of the independently modulated pixels including a reflective region, wherein said mask allows illumination of only a portion of the reflective region of each of the independently modulated pixels by the light from the light source;

wherein said object is illuminated by receiving said reflected light from said spatial light modulator.

25. The system of claim 24 and further comprising a scanner positioned between said light source and said spatial light modulator, said scanner for imaging said light on some of said rows of independently modulated pixels.

26. The system of claim 24 wherein each of the n rows includes a plurality of independently modulated pixels which are staggered with respect to the independently modulated pixels of others of the n rows.

27. The system of claim 24 wherein said spatial light modulator comprises a movable mirror device.

28. The system of claim 24 and further comprising light directing optics between said light source and said spatial light modulator for simultaneously illuminating all of said rows of independently modulated pixels.

* * * * *